(12) United States Patent
Sosna et al.

(10) Patent No.: US 10,375,132 B2
(45) Date of Patent: *Aug. 6, 2019

(54) SYSTEM AND METHOD FOR REMOTE PRESENTATION

(71) Applicant: Veeva Systems Inc., Pleasanton, CA (US)

(72) Inventors: Arno Sosna, Pleasanton, CA (US); Cindy Chiang, Sunnyvale, CA (US); Sunil Kulkarni, Pleasanton, CA (US); Hanqing Liao, Danville, CA (US); Vasanth Shenoy, San Ramon, CA (US); Timothy S. Murphy, Berkeley, CA (US)

(73) Assignee: Veeva Systems Inc., Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/680,091

(22) Filed: Aug. 17, 2017

(65) Prior Publication Data

US 2018/0124358 A1 May 3, 2018

Related U.S. Application Data

(63) Continuation of application No. 15/341,901, filed on Nov. 2, 2016, now Pat. No. 9,860,488.

(51) Int. Cl.
*H04N 7/15* (2006.01)
*G06Q 30/00* (2012.01)
*H04L 29/06* (2006.01)

(52) U.S. Cl.
CPC .......... *H04L 65/403* (2013.01); *G06Q 30/00* (2013.01); *H04N 7/155* (2013.01)

(58) Field of Classification Search
CPC combination set(s) only.
See application file for complete search history.

(56) References Cited

U.S. PATENT DOCUMENTS

| | | | |
|---|---|---|---|
| 5,572,728 A * | 11/1996 | Tada | ................. G06F 17/30017 |
| 9,563,420 B2 | 2/2017 | Osminer | |
| 2007/0263825 A1 | 11/2007 | Shah et al. | |
| 2008/0040189 A1 | 2/2008 | Tong et al. | |

(Continued)

FOREIGN PATENT DOCUMENTS

| | | |
|---|---|---|
| JP | 2005-130257 A1 | 5/2005 |
| JP | 2009-267810 A1 | 11/2009 |

(Continued)

*Primary Examiner* — Phung-Hoang J Nguyen

(57) ABSTRACT

Systems and methods for creating call reports which may allow a sales user to remotely present content to HCP users. Information for scheduling a remote meeting may be received from an application for creating call report on a first user computing device, a request for remote meeting may be sent to a video conference system, a group meeting ID may be received from the video conference system, and a meeting invitation for the at least one invitee may be generated. The meeting invitation may include a link for the remote meeting. When the at least one invitee clicks on the link in the invitation, he/she is added to the remote meeting. The video content is transmitted via the video conference system, but no user interface of the video conference system is displayed during the remote meeting.

17 Claims, 13 Drawing Sheets

(56) References Cited

U.S. PATENT DOCUMENTS

| | | |
|---|---|---|
| 2009/0204904 A1 | 8/2009 | Mujic et al. |
| 2009/0216837 A1 | 8/2009 | Rao et al. |
| 2009/0228808 A1 | 9/2009 | MacDonald et al. |
| 2009/0276498 A1 | 11/2009 | Lyle |
| 2010/0325204 A1 | 12/2010 | Mathias |
| 2011/0099042 A1 | 4/2011 | Yerkes |
| 2011/0320458 A1* | 12/2011 | Karana ............ G06F 17/30286 |
| | | 707/741 |
| 2013/0018952 A1 | 1/2013 | McConnell |
| 2014/0024400 A1 | 1/2014 | Kang |
| 2014/0313282 A1 | 10/2014 | Ma et al. |
| 2015/0200785 A1 | 7/2015 | Gupta et al. |
| 2016/0112572 A1 | 4/2016 | Ma et al. |
| 2016/0255466 A1 | 9/2016 | Shuster |
| 2016/0342916 A1* | 11/2016 | Arceneaux ....... G06Q 10/06313 |
| 2017/0046411 A1 | 2/2017 | D'Souza |

FOREIGN PATENT DOCUMENTS

| | | |
|---|---|---|
| JP | 2010-061329 A1 | 3/2010 |
| JP | 2010-141417 A1 | 6/2010 |
| JP | 2010-282596 A1 | 12/2010 |

\* cited by examiner

FIG. 6

Cancel | Call Report | 📁 Media | Sign | ⌂

Call Address
- Address Line 1 | Address
- Address Line 2 | Parent Address

Professional Information
- Account: Clinton Ackerman | Record Type: Call Report
- Datetime: 27/6/2016 10:36 | Territory: 101
- Call Conflict Status ⚠ | Total Call Attendee Count
- Call Type | Unlock ☐
- Remote Meeting

Call Owner
- Owner: Admin User | Assigner
- Status | Assignment Datetime

Product Priorities
- Product Priority 1 | Product Priority 4
- Product Priority 2 | Product Priority 5
- Product Priority 3

SYSTEM AND METHOD FOR REMOTE PRESENTATION

CROSS-REFERENCE TO RELATED APPLICATION

The present application is a continuation application of U.S. nonprovisional patent application Ser. No. 15/341,901, filed on Nov. 2, 2016, entitled System and Method for Remote Presentation, which is hereby incorporated by reference herein for all purposes.

BACKGROUND

The subject technology relates generally to customer relationship management ("CRM"), and more particularly to presenting video content remotely.

In the pharmaceutical sales industry, sales representatives are required to use call reports to record meetings and other interactions with doctors, including face-to-face meetings and discussions via phone or the Internet, and the call reports need to include the doctors' professional information, the medical products discussed, the materials shown to the doctors, the samples left, etc. Non-compliant call reports may expose company employers (e.g., a pharmaceutical company) to regulatory penalties or other legal liabilities. Since more and more marketing materials include video content, it is desirable to enable sales representatives to present video content remotely and generate compliant call reports.

SUMMARY

The disclosed subject matter relates to a method for creating a call report. The method comprises: receiving information for scheduling a remote meeting from an application for creating call report on a first user computing device, wherein the information for scheduling the remote meeting comprises time of the remote meeting, and identity information of at least one invitee of the remote meeting. The method further comprises: sending a request for remote meeting to a video conference system, wherein the request for remote meeting includes information of the at least one invitee. The method further comprises: receiving a group meeting ID from the video conference system, wherein the group meeting ID is generated by the video conference system for the remote meeting. The method further comprises: generating a meeting invitation for the at least one invitee, wherein the meeting invitation incorporates the group meeting ID. The method further comprises: receiving a request to join the remote meeting from a second user computing device.

BRIEF DESCRIPTION OF THE DRAWINGS

FIG. 6 illustrates an example user interface ("UI") for creating a call report according to one embodiment of the present invention.

FIG. 12 illustrates an example user interface for creating a call report according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
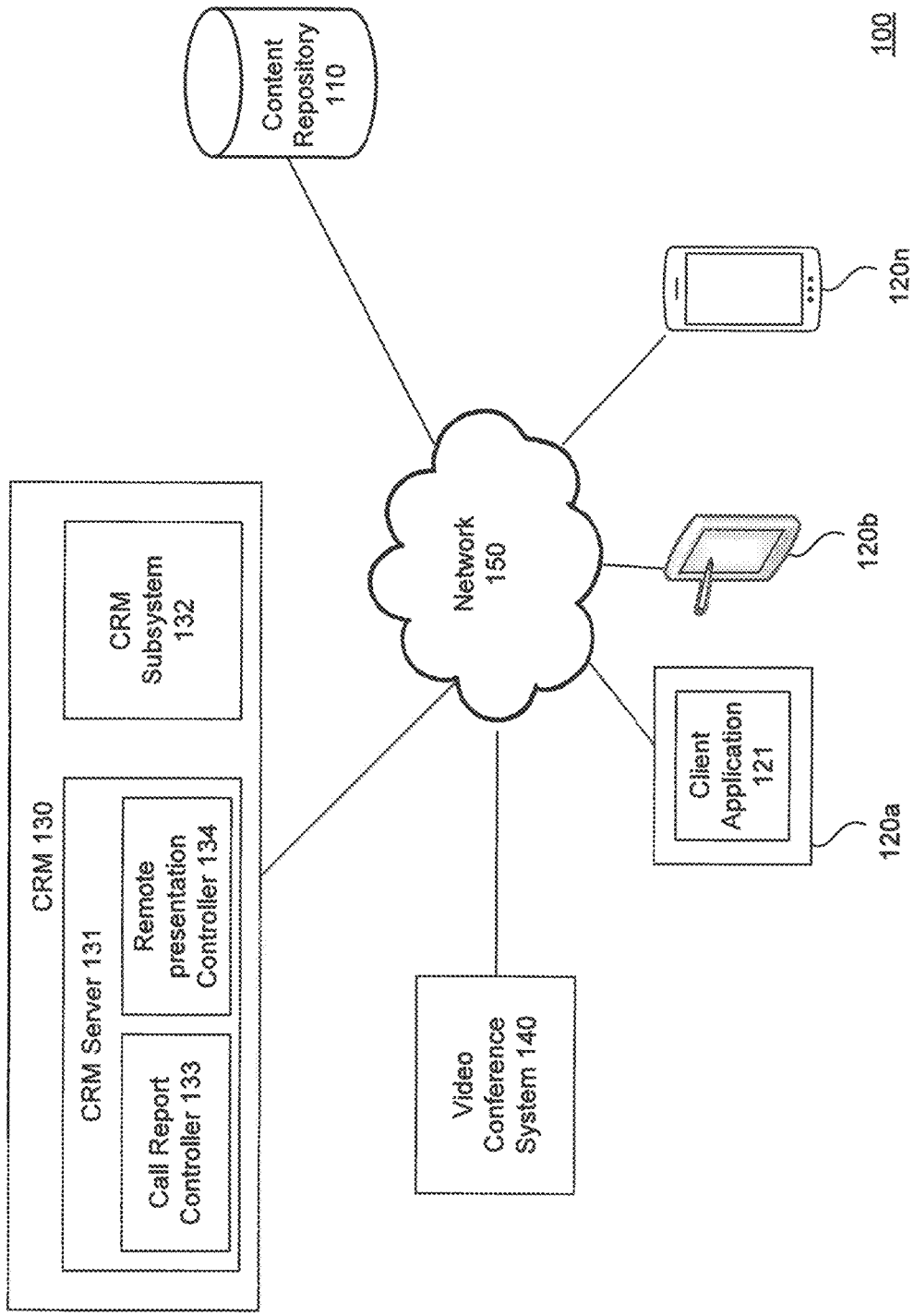
FIG. 1 illustrates an example high level block diagram of a customer relationship management architecture wherein the present invention may be implemented.

FIG. 1 illustrates an example high level block diagram of a customer relationship management architecture 100 wherein the present invention may be implemented. As shown, the architecture 100 may include a content repository 110, a plurality of user computing devices 120a, 120b, ... 120n, and a CRM 130, a video conference system 140, coupled to each other via a network 150. The CRM 130 may include a customer relationship management server 131, and a customer relationship management subsystem 132. The customer relationship management server 131 may further include a call report controller 133 and a remote presentation controller 134. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 130 via the network 150, and may be any commercially available computing devices including laptop computers, desktop computers, mobile phones, smart phones, tablet computers, netbooks, and personal digital assistants (PDAs). A CRM client application 121 may run from a user computing device, e.g., 120a, and access the CRM 130 via the network 150. User computing devices 120a-120n are illustrated in more detail in FIG. 3.

The video conference system 140 may be owned and operated by a third party.

The content repository 110 may store content that a user (e.g., a sales representative) may access via client applications (e.g., 121) in user computing devices 120a-120n and show to a doctor, and may be any commercially available storage devices. In an embodiment, the content repository 110 is a cloud-based or distributed network based system for consolidating an enterprise's data, oftentimes integrating multiple content repositories in an enterprise into a single system having coordinated control, measuring, and auditing of data creation, access and distribution. In an embodiment, this content repository 110 may include specific data collections for the life sciences industry, although it may store content for other industries. In one embodiment, the content repository 110 may provide an end-to-end solution for the development, approval, distribution, expiration and withdrawal of promotional materials. In one embodiment, the content repository 110 may store marketing materials, including video content. In one embodiment, the content repository 110 may include a Closed Loop Marketing ("CLM") system.

The customer relationship management server 131 is typically a remote computer system accessible over a remote or local network, such as the network 150, and may provide access to the customer relationship management subsystem 132. The customer relationship management server 131 could be any commercially available computing devices. A client application (e.g., 121) process may be active on one or more user computing devices 120a-120n. The corresponding server process may be active on the customer relationship management server 131. The client application process and the corresponding server process may communicate with each other over the network 150, thus providing distributed functionality and allowing multiple client applications to take advantage of the information-gathering capabilities of the CRM 130.

In one implementation, the customer relationship management server 131 may include a call report controller 133 which may control the process for generating a call report, and a remote presentation controller 134 which may control the process for remotely presenting marketing materials, including video content, as will be described with reference to FIGS. 5A and 5B below.

Although the customer relationship management server 131, the call report controller 133 and the remote presentation controller 134 are shown in one server, it should be understood that they may be implemented in multiple servers.

In one implementation, the customer relationship management subsystem 132 contains all contact information that may be available to users. In addition to storage of contact information, the customer relationship management subsystem 132 may also be capable of storing configurations regarding specific preferences, regulatory limitations and requirements, and other fields that will facilitate communications, in general or on a by-recipient basis.

In one implementation, the customer relationship management subsystem 132 is capable of communication with multiple sources through the customer relationship management server 131 or through other channels to maintain a current and accurate collection of information regarding customer accounts, which may include group accounts and individual accounts. The interface with the multiple sources can be, for example, through an Applications Programming Interface or API, as the API interface will allow compatibility with a flexible array of third-party provider servers.

The information being updated may include, but is not limited to, licensing information, area of practice, and location of the various customer accounts. In this manner, the customer relationship management subsystem 132 pulls the approved version of what represents an account, which may be a hospital or physician, which then pulls from multiple networks to ensure that the information regarding an account is up-to-date.

In one implementation, the customer relationship management subsystem 132 may be operated by a third party.

In one implementation, the CRM 130 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 130.

Although the embodiments are described with a customer relationship management subsystem 132, the customer information and content may be from other types of information management systems, e.g., a Closed Loop Marketing (CLM) system.

In one embodiment, the CRM 130 may run on a cloud computing platform. Users can access content on the cloud independently by using a virtual machine image, or purchasing access to a service maintained by a cloud database provider. The customer relationship management subsystem 132 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 130 may be provided as Software as a Service ("SaaS") to allow users to access it with a thin client.

Figure 2:
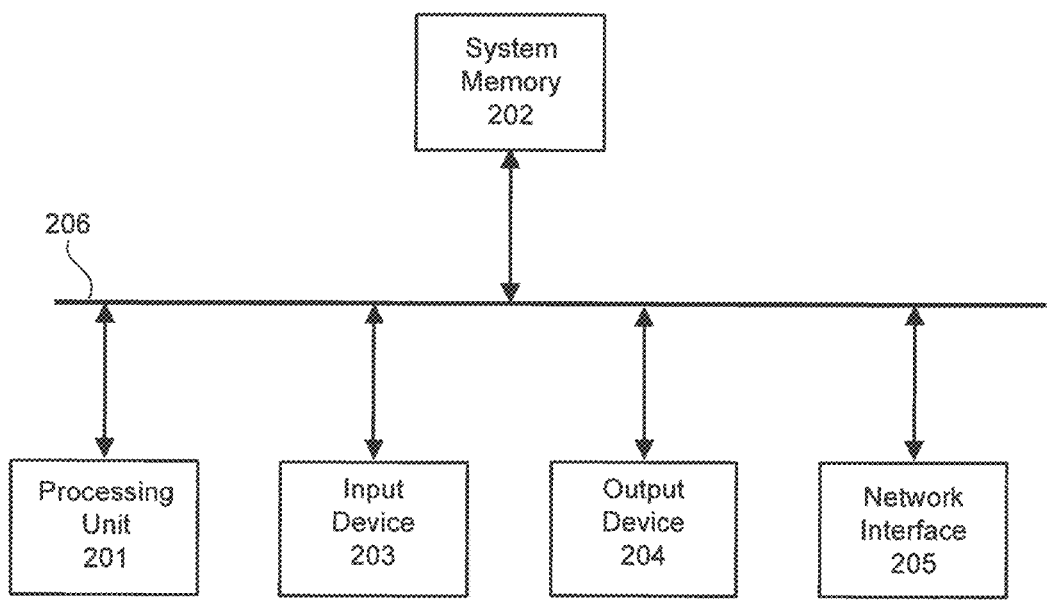
FIG. 2 illustrates an example block diagram of a computing device.

FIG. 2 illustrates an example block diagram of a computing device 200 which can be used as the user computing devices 120a-120n, and the customer management relationship server 131 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
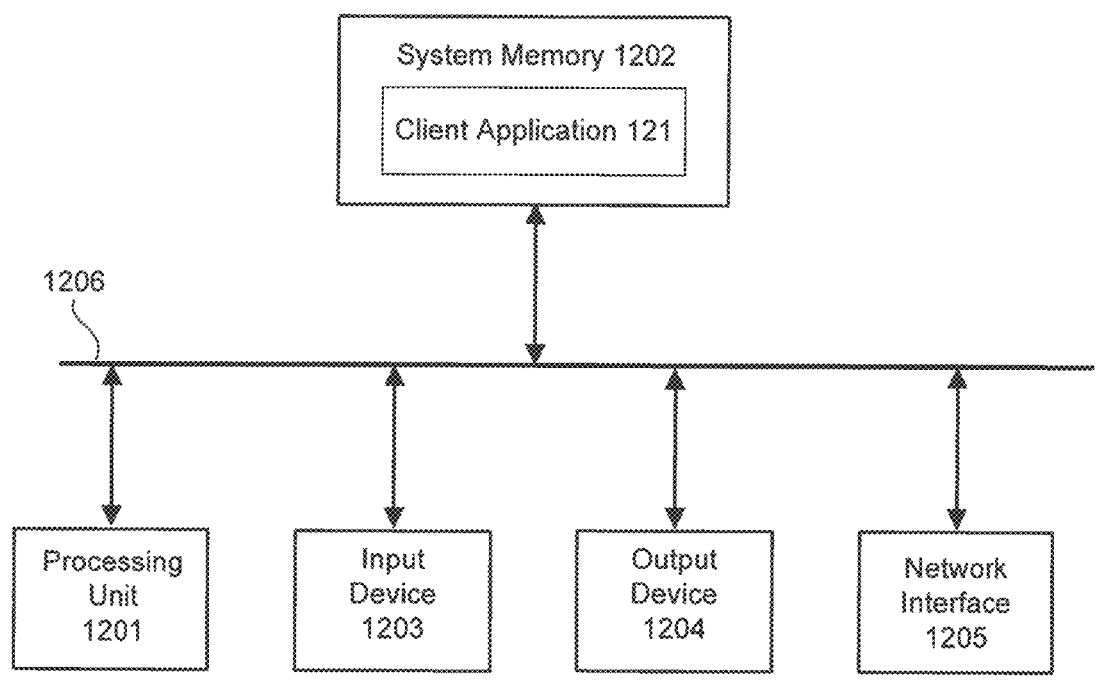
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The system memory 1202 may store the CRM client application 121.

Figure 4:
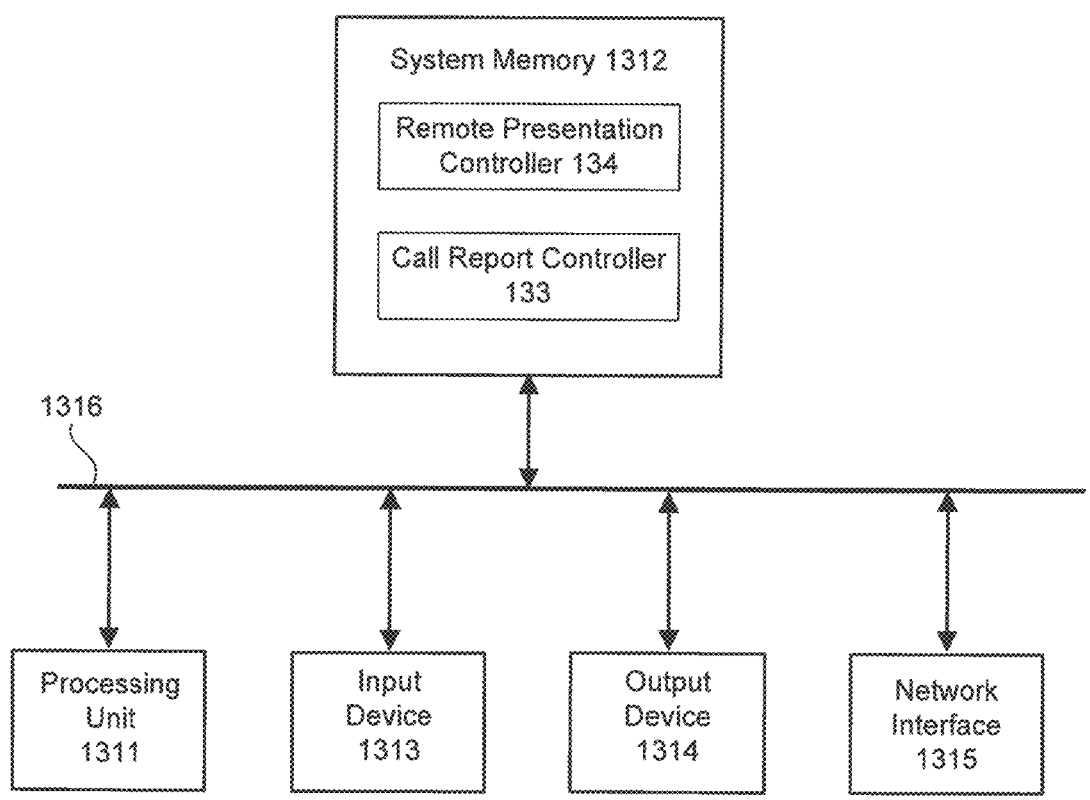
FIG. 4 illustrates an example high level block diagram of the customer relationship management server according to one embodiment of the present invention.

FIG. 4 illustrates an example high level block diagram of the customer relationship management server 131 according to one embodiment of the present invention. The customer relationship management server 131 may be implemented by the computing device 200, and may have a processing unit 1311, a system memory 1312, an input device 1313, an output device 1314, and a network interface 1315, coupled to each other via a system bus 1316. The system memory 1312 may store the call report controller 133 and the remote presentation controller 134.

Figure 5A:
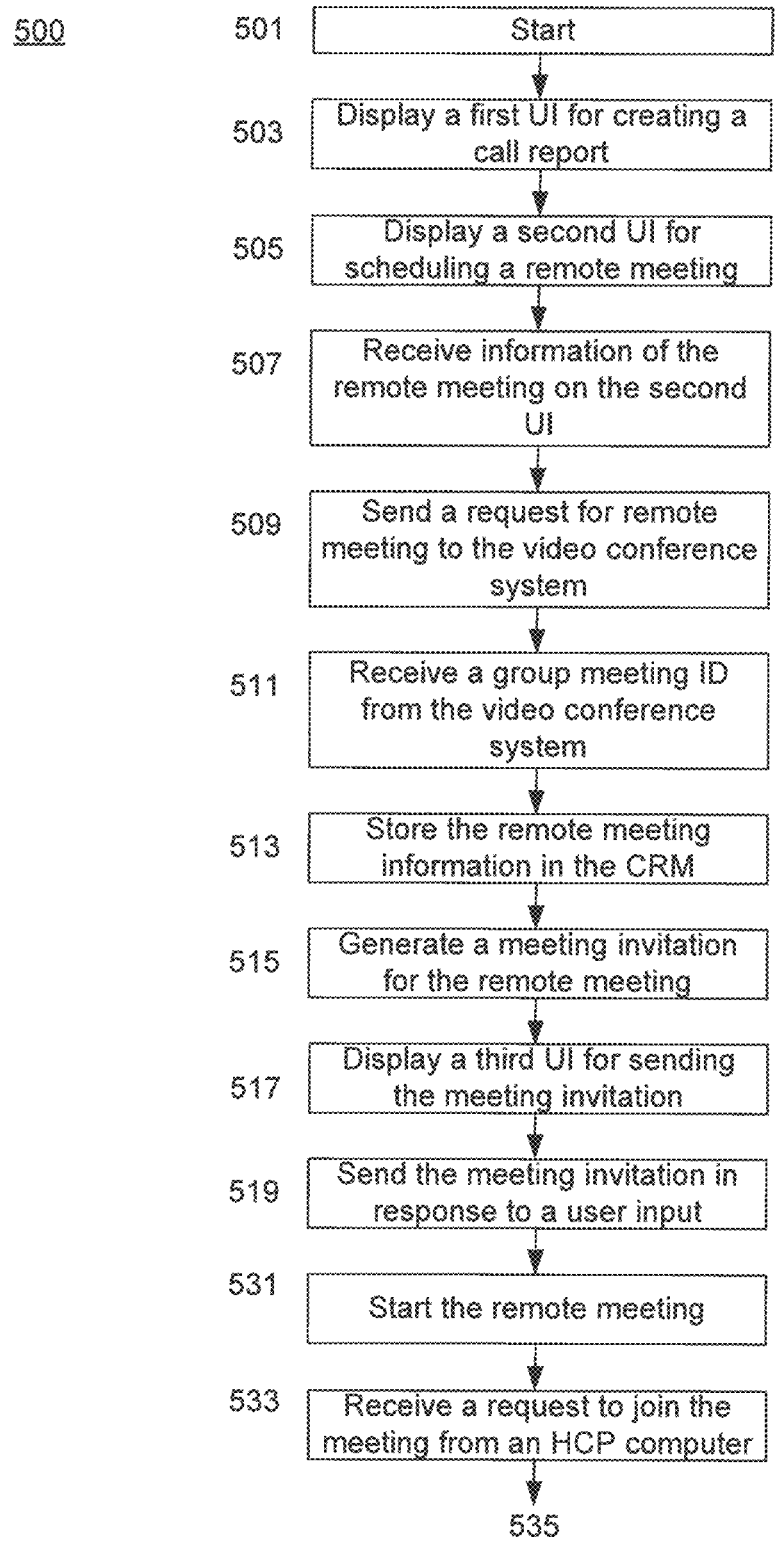
FIGS. 5A and 5B illustrate an example flowchart of a method for generating a call report according to one embodiment of the present invention.
Figure 5B:
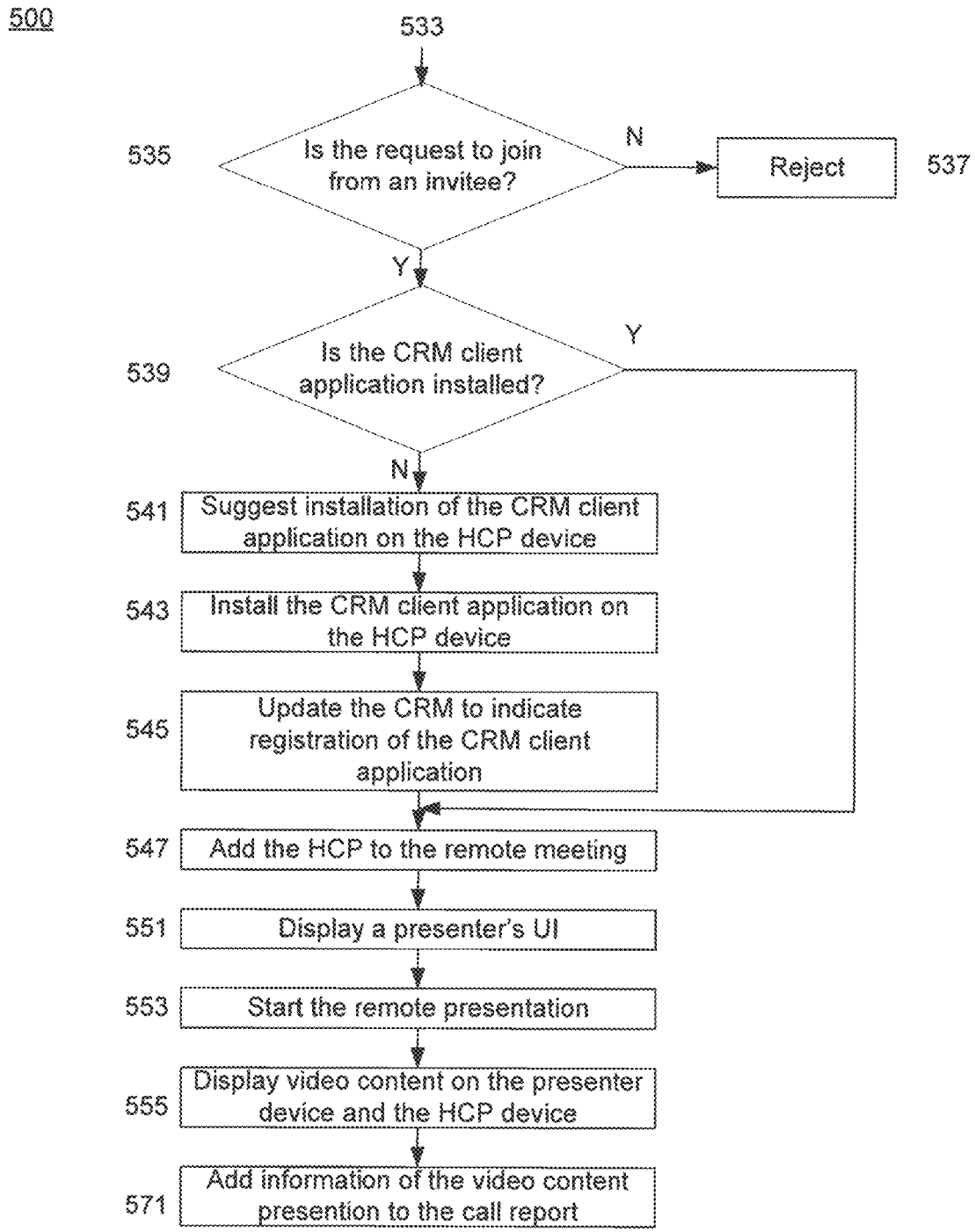
Figure 7:
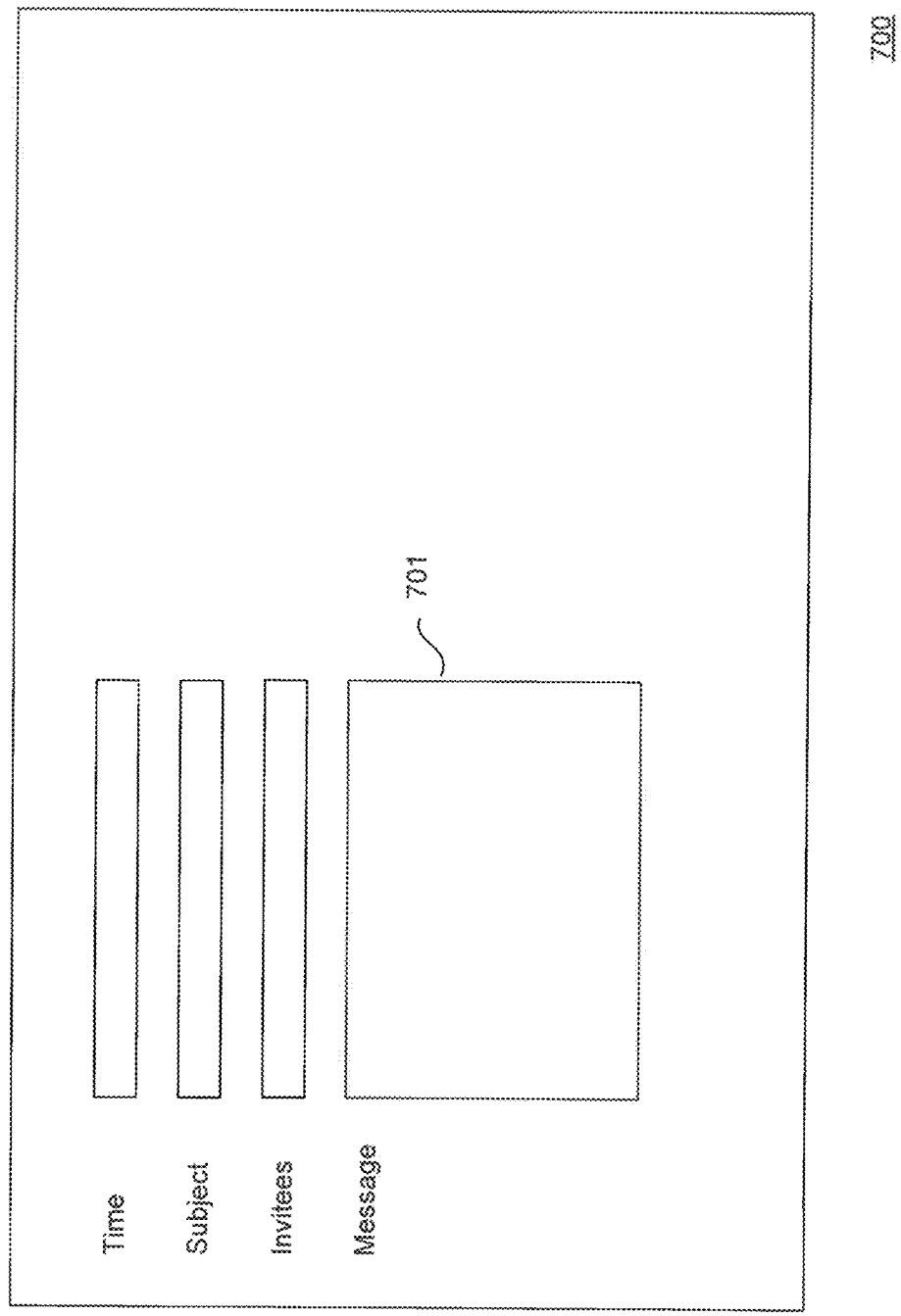
FIG. 7 illustrates an example user interface for scheduling a remote meeting according to one embodiment of the present invention.
Figure 8:
FIG. 8 illustrates an example user interface for creating a call report according to one embodiment of the present invention.

FIGS. 5A and 5B illustrate an example flowchart of a method for creating a call report according to one embodiment of the present invention. The process may start at 501.

At 503, a call report may be created by a sales user on a first user computing device (e.g., 120a). A first user interface 600 shown in FIG. 6 may be displayed on the first user computing device for the sales user to enter call report information, e.g., health care professional ("HCP") information, call owner, call address, and product priorities. The user interface may be a graphical user interface ("GUI"). The first user interface 600 may include a button 601 for scheduling a remote meeting.

At 505, the sales user my click on the button 601 to schedule a remote meeting, and a second user interface 700 may be displayed. The second user interface 700 may include areas for the sales user to input remote meeting information, e.g., the time, subject and one or more invitees of the remote meeting. The one or more invitees may be selected by the sales user from HCP users assigned to his/her territory in the CRM subsystem 132. The second user interface 700 may also have an area 701 for the sales user to input a message to the invitees. In one implementation, meeting scheduling function of a video conference system, e.g., Zoom™, may be used to schedule the meeting.

At 507, input from the sales user may be received on the second user interface 700.

At 509, a request for remote meeting, including information of the sales user and the invitees, time and subject, may be sent by the remote presentation controller 134 to the video conference system 140.

At 511, a remote meeting may be generated by the video conference system 140 and a group meeting ID shared by all invitees may be returned from the video conference system 140 to the remote presentation controller 134.

At 513, remote meeting information, which may have the group meeting ID from the video conference system 140, time, subject and attendees, may be stored in the CRM subsystem 132, and in the sales user's calendar as well.

At 515, a meeting invitation may be generated by the remote presentation controller 134. In one implementation, the meeting invitation may include the group meeting ID. In one implementation, the meeting invitation may include a link for the remote meeting.

At 517, a third user interface 800 may be generated and displayed. As shown, a button 801 for sending meeting invitations and a button 802 for starting the remote meeting may be added to the first user interface 600.

Figure 9:
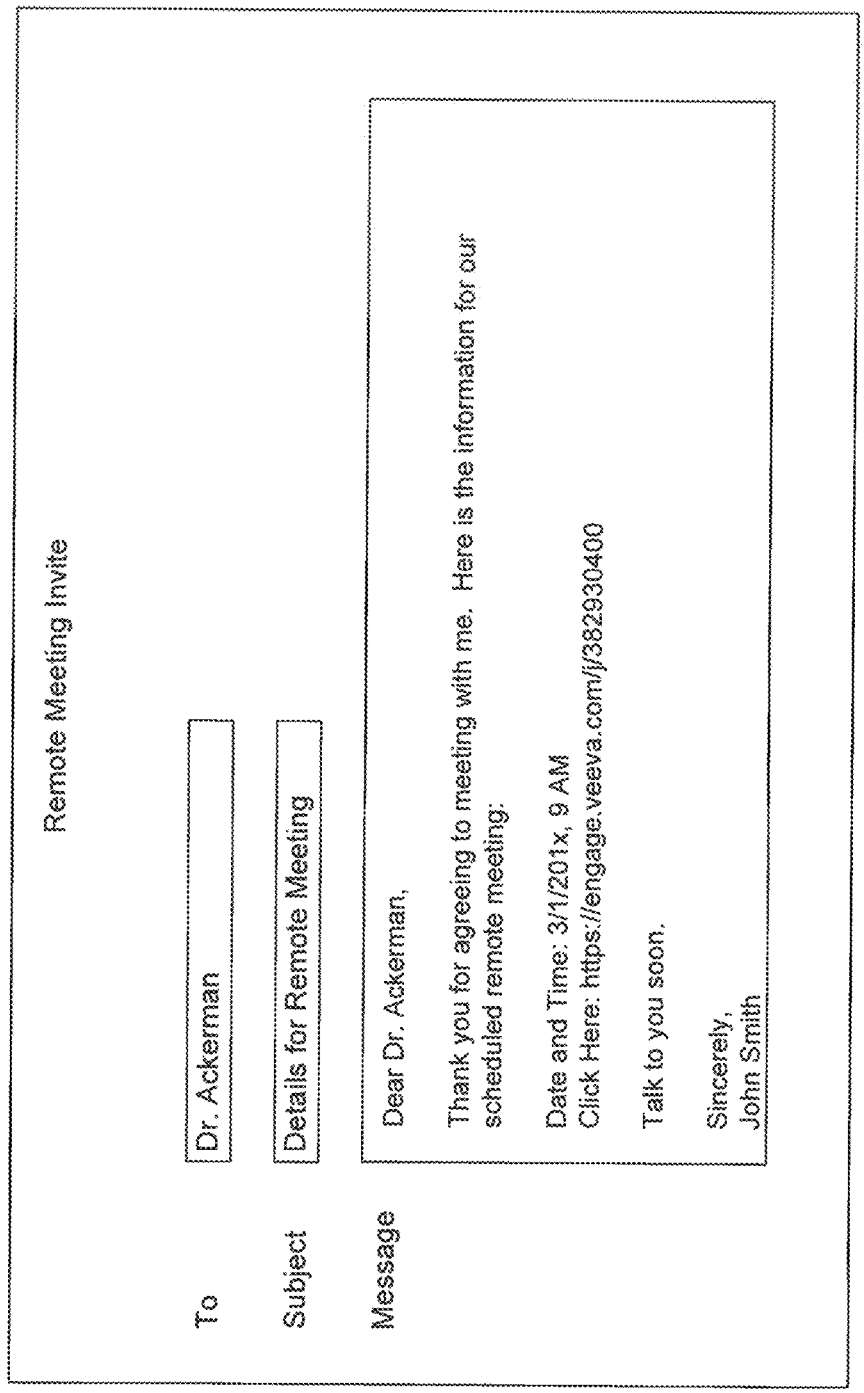
FIG. 9 illustrates an example email invitation for a remote meeting according to one embodiment of the present invention.

At 519, the meeting invitations may be sent from the first user computing device 120a to each invitee via, e.g., an email, a message or an SMS. FIG. 9 illustrates an example of an email received by an invitee. As shown, the email may include a link for the remote meeting, and an invitee, e.g., an HCP user, may click on the link to join the remote meeting. The meeting invitation may be added to each attendee's calendar.

Figure 10:
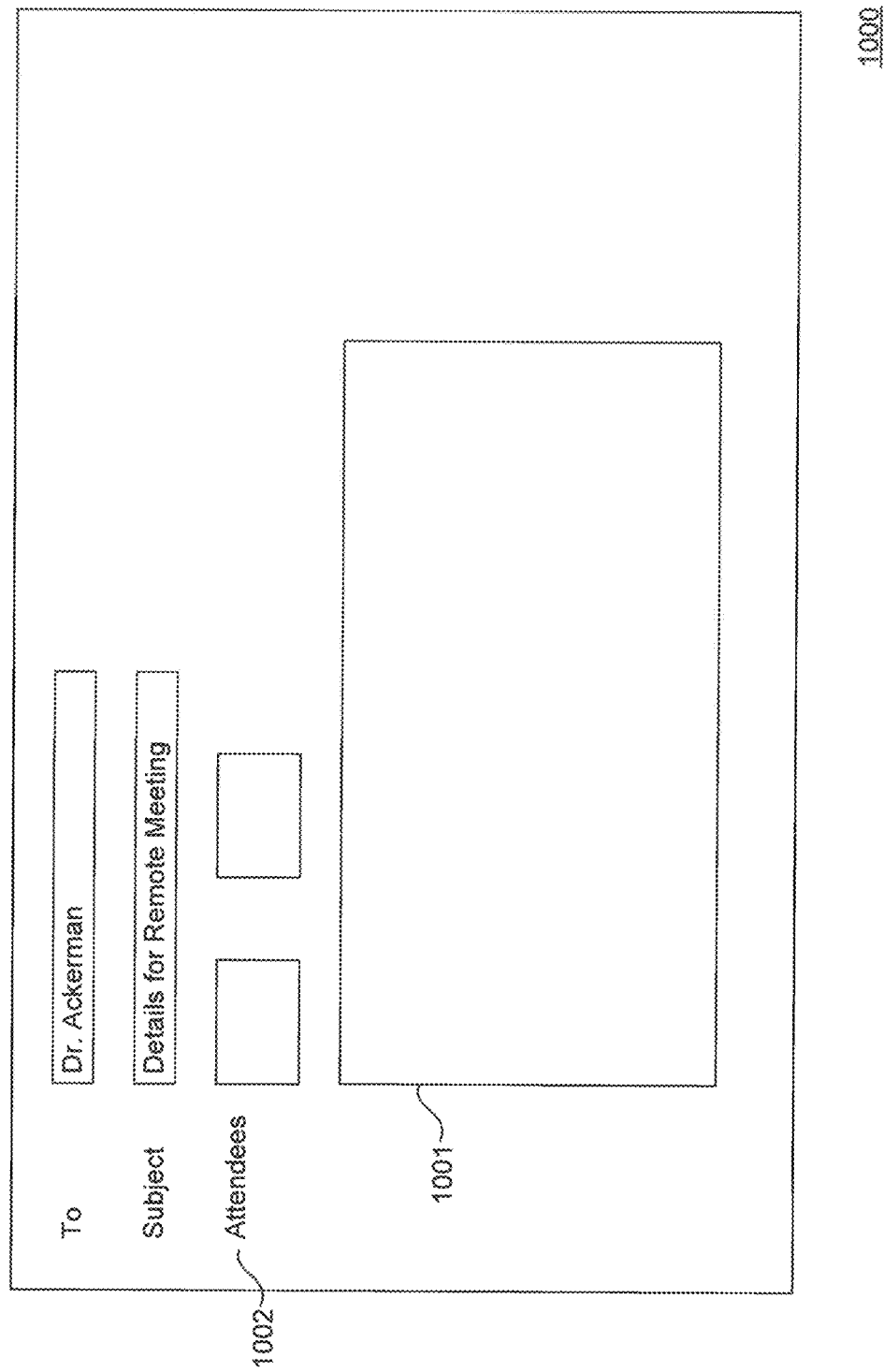
FIG. 10 illustrates an example user interface for creating a call report after a remote meeting is initiated according to one embodiment of the present invention.
Figure 11:
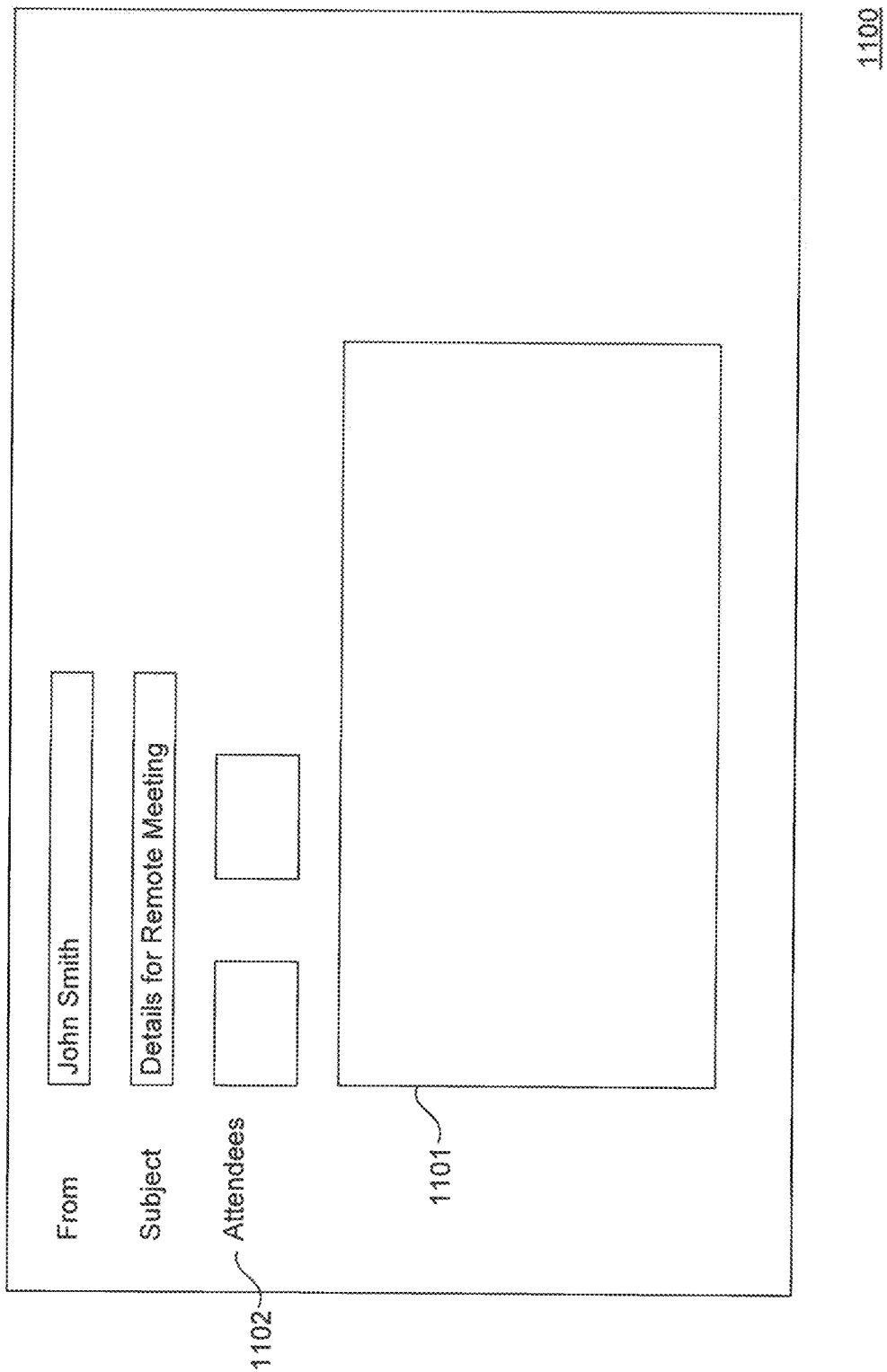
FIG. 11 illustrates an example user interface for participating a remote meeting according to one embodiment of the present invention.

At 531, a fourth user interface 1000 as shown in FIG. 10 may be displayed on the first user computing device, when the sales user initiates the remote meeting at the meeting time, e.g., by clicking on the start button 802. The fourth user interface may include an area 1001 for the sales user to present remotely, and an area 1002 for displaying status of the attendees (e.g., joined, speaking, mute and presenting).

At 533, a request to join the remote meeting may be received from a second user computing device (e.g., 120b) when the HCP user (e.g., Dr. Clinton Ackerman) clicks on the link in the meeting invitation.

At 535, it may be determined by the remote presentation controller 134 if the HCP user is an invitee of the remote meeting, e.g., by verifying the link the HCP user clicked on against the link in the meeting invitation.

If the verification is not successful, the request to join the remoting meeting may be rejected at 537.

Otherwise, at 539, it may be determined if the CRM client application 121 is installed on the second user computing device 120b. If the CRM client application 121 is installed on the second user computing device 120b, the process may process to 547.

If the CRM client application 121 is not installed on the second user computing device 120b, at 541, a pop-up window may be displayed on the second user computing device 120b to suggest the HCP user to install the CRM client application 121.

The CRM client application 121 may be installed on the second user computing device at 543.

At 545, the CRM subsystem 132 may be updated to indicate that the CRM client application 121 is registered with the HCP user, e.g., via the HCP user's email address.

At 547, the HCP user may be added to the remote meeting.

At 551, a fifth user interface 1100 may be displayed on the second user computing device 120b. The fifth user interface 1100 may include an area 1101 for displaying meeting information, e.g., subject of the meeting, and status of the attendees (e.g., joined, speaking, mute, and presenting). The fifth user interface 1100 may also include an area 1102 for displaying content presented remotely from the first user computing device 120*a*. To make sure that the call would not cause any compliant issue, the fifth user interface 1100 does not display anything other than the meeting information and the content presented from the first user computing device. When the sales user is not online, has not started the meeting, or the first user computing device 120*a* is displaying a screen other than the remote meeting, a welcome screen including only the meeting information and a welcome message may be displayed on the second user computing device 120*b* to prevent compliance issues.

At 553, the sales user may start the remote presentation in the area 1001. A video conference system, e.g., Zoom™, may be used for transmitting signals between the user computing device 120*a* and the user computer device 120*b*. In one implementation, the transmission function of the video conference application may be embedded in the CRM client application 121, so that the HCP user can rely on the CRM client application 121 for the call and remote presentation without having to install an application for the video conference system 140 separately. The HCP user would not see any user interface of the video teleconference application either.

The video content presented may be stored in the content repository 110 or on the first user computing device 120*a*. In one implementation, the remote presentation controller 134 may check the video to be presented and only enable presentation that the sales user is authorized to present.

At 555, marketing materials in various format, e.g., video, portable document format ("PDF"), PowerPoint, web content, html, and drawings may be displayed on the fourth user interface 1000 and the fifth user interface 1100.

Figure 12:
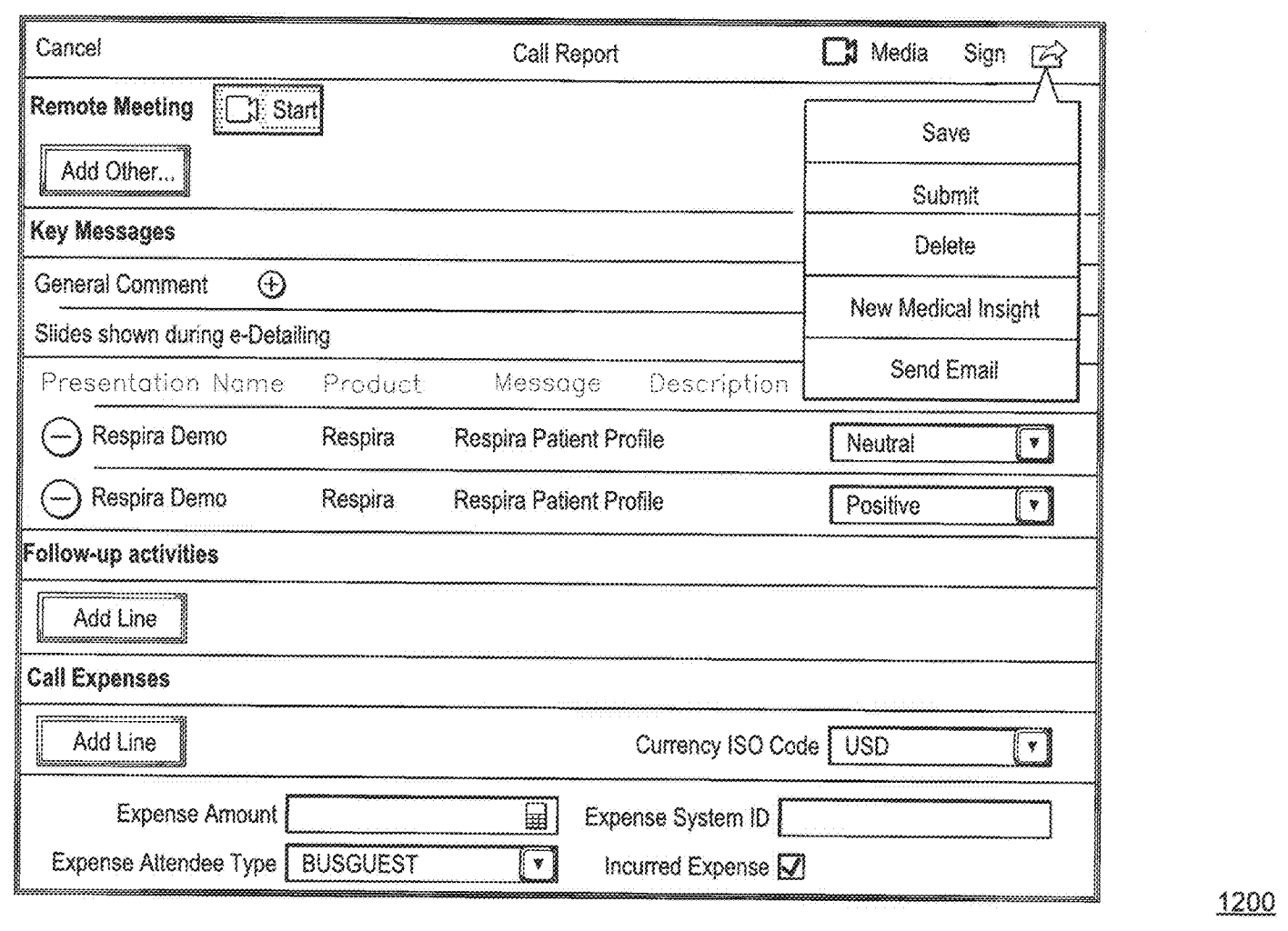

At 571, a call report may be generated. The call report may include information of the video content presented, as shown in the sixth user interface 1200 shown in FIG. 12.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for creating a call report, the method comprising:
   receiving information for scheduling a remote meeting from an application for creating call report on a first user computing device, wherein the information for scheduling the remote meeting comprises time of the remote meeting, and identity information of at least one invitee of the remote meeting;
   sending a request for remote meeting from a system for creating call report to a video conference system, wherein the request for remote meeting includes information of the at least one invitee;
   receiving a group meeting ID at the system for creating call report from the video conference system, wherein the group meeting ID is generated by the video conference system for the remote meeting in response to the request for remote meeting from the system for creating call report, and wherein the group meeting ID is shared by the at least one invitee;
   generating a meeting invitation for the at least one invitee at the system for creating call report, wherein the meeting invitation incorporates the group meeting ID received from the video conference system;
   receiving a request to join the remote meeting from a second user computing device; and
   displaying the remote meeting on a user interface of the application for creating call report, wherein the call report comprises content of the remote meeting.

2. The method of claim 1, further comprising: determining that the request to join the remote meeting is from the at least one invitee.

3. The method of claim 1, further comprising: enabling the at least one invitee to join the remote meeting.

4. The method of claim 1, wherein the at least one invitee is selected from accounts in the system for creating call report, and wherein the system for creating call report is a customer relationship management ("CRM") system.

5. The method of claim 4, further comprising: storing information of the remote meeting in the CRM system, wherein the information of the remote meeting comprises time of the remote meeting and identity information of the at least one invitee.

6. The method of claim 1, wherein the meeting invitation comprises a link for the remote meeting.

7. The method of claim 6, wherein the meeting invitation is an email comprising the link for the remote meeting.

8. The method of claim 6, further comprising: using the link for the remote meeting to determine if the request to join the remote meeting is from the at least one invitee.

9. The method of claim 1, further comprising: determining if an application for attending the remote meeting is installed on the second user computing device.

10. The method of claim 9, further comprising: enabling installation of the application for attending the remote meeting on the second user computing device.

11. The method of claim 1, further comprising: displaying content on the first user computing device.

12. A system for creating a call report, comprising:
   a remote presentation controller for:
      receiving information for scheduling a remote meeting from an application for creating call report on a first user computing device, wherein the information for scheduling a remote meeting comprises time of the remote meeting, and identity information of at least one invitee of the remote meeting;
      sending a request for remote meeting to a video conference system, wherein the request for remote meeting includes information of the at least one invitee;
      receiving a group meeting ID from the video conference system, wherein the group meeting ID is generated by the video conference system for the remote meeting in response to the request for remote meeting from the system for creating call report, and wherein the group meeting ID is shared by the at least one invitee;
      generating a meeting invitation for the at least one invitee, wherein the meeting invitation incorporates the group meeting ID received from the video conference system;
      receiving a request to join the remote meeting from a second user computing device; and
      displaying the remote meeting on a user interface of the application for creating call report, wherein the call report comprises content of the remote meeting.

13. The system of claim 12, further comprising: a call report controller for adding information about content presented during the remote meeting to the call report.

14. The system of claim 12, further comprising: a CRM system for storing information of the at least one invitee and information of the remote meeting.

15. The system of claim 12, wherein the remote presentation controller further determines that the request to join the remote meeting is from the at least one invitee.

16. The system of claim 12, wherein the remote presentation controller further enables the at least one invitee to join the remote meeting.

17. The system of claim 12, wherein the remote presentation controller further determines if an application for attending the remote meeting is installed on the second user computing device.

* * * * *